(12) United States Patent
Nagura

(10) Patent No.: US 10,969,284 B2
(45) Date of Patent: Apr. 6, 2021

(54) OPTICAL SENSOR AND APPARATUS INCLUDING OPTICAL SENSOR

(71) Applicant: CANON KABUSHIKI KAISHA, Tokyo (JP)

(72) Inventor: Chihiro Nagura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/372,208

(22) Filed: Apr. 1, 2019

(65) Prior Publication Data

US 2019/0310151 A1    Oct. 10, 2019

(30) Foreign Application Priority Data

Apr. 4, 2018 (JP) .............................. JP2018-072602

(51) Int. Cl.
| | |
|---|---|
| *G01L 5/00* | (2006.01) |
| *G01L 5/166* | (2020.01) |
| *B25J 18/00* | (2006.01) |
| *G01B 11/16* | (2006.01) |
| *G01L 1/24* | (2006.01) |

(52) U.S. Cl.
CPC ............... *G01L 5/166* (2013.01); *B25J 18/00* (2013.01); *G01B 11/161* (2013.01); *G01L 1/24* (2013.01)

(58) Field of Classification Search
CPC . G01L 5/166; G01L 1/24; B25J 18/00; G01B 11/161

USPC .................... 73/862, 624, 862.624
See application file for complete search history.

(56) References Cited

U.S. PATENT DOCUMENTS

| | | | | |
|---|---|---|---|---|
| 4,745,294 | A * | 5/1988 | Kohashi ................. | H01L 31/12 250/551 |
| 9,366,587 | B2 * | 6/2016 | Nagura .............. | G01B 9/02028 |
| 9,377,900 | B1 * | 6/2016 | Baldwin ........... | H04W 12/0605 |
| 9,720,277 | B2 * | 8/2017 | Yamazaki ......... | G02F 1/133555 |
| 2009/0159799 | A1 * | 6/2009 | Copeland .................. | G01J 3/51 250/338.1 |
| 2010/0282318 | A1 * | 11/2010 | Kalkanoglu ............ | H01L 31/02 136/259 |
| 2018/0136747 | A1 * | 5/2018 | Keam ................ | G06F 3/03545 |

FOREIGN PATENT DOCUMENTS

JP    2010-281635 A    12/2010

* cited by examiner

*Primary Examiner* — Max H Noori
(74) *Attorney, Agent, or Firm* — Canon U.S.A., Inc., IP Division

(57) ABSTRACT

There is provided an optical sensor that includes a base portion, an action portion, a reflecting member disposed at one of the base portion and the action portion, and a detection unit including a light source and a light receiving element disposed at the other one of the base portion and the action portion. In the optical sensor, a space between the detection unit and the reflecting member is filled with a light transmissive material, and a force and/or acceleration is detected due to the light receiving element detecting light emitted from the light source and reflected by the reflecting member.

11 Claims, 7 Drawing Sheets

OPTICAL SENSOR AND APPARATUS INCLUDING OPTICAL SENSOR

BACKGROUND OF THE INVENTION

Field of the Invention

The present disclosure relates to an optical sensor that detects an external force quantifiably.

Description of the Related Art

A force sensor has been used for detecting external forces acting on an arm of an industrial robot or a section of a manipulator.

An optical force sensor is proposed as a type of force sensor that detects a multicomponent external force (Japanese Patent Laid-Open No. 2010-281635). The optical force sensor obtains displacement information by using an optical displacement sensor constituted by a plurality of rows of light receiving elements and detects an external force quantifiably from the displacement information. This type of sensor can detect multicomponent displacement with respect to a plane on which the sensor is mounted as well as out-of-plane displacement. By using this type of sensor, a thin multicomponent force sensor can be formed.

A disadvantage associated with the known force sensor described above is that the sensor cannot detect accurately once foreign matter, such as dust or oil, enters the optical path from a light emitting element to a light receiving element. Moreover, if there exists an interface between a transparent medium and air along the optical path, stray light is generated by reflection at the interface due to the difference in index of refraction between air and the medium, which degrades the signal-to-noise ratio.

SUMMARY OF THE INVENTION

The present disclosure provides an optical sensor that can detect a force and/or acceleration with high accuracy and high reliability by suppressing the likelihood of foreign matter entering between an action portion and a base portion and suppressing deterioration of the signal-to-noise ratio caused by stray light.

The present disclosure provides an optical sensor that includes
a base portion, an action portion,
a reflecting member disposed at one of the base portion and the action portion, and a detection unit including a light source and a light receiving element disposed at the other one of the base portion and the action portion.
In the optical sensor, a space between the detection unit and the reflecting member is filled with a light transmissive material, and
a force and/or acceleration is detected due to the light receiving element detecting light emitted from the light source and reflected by the reflecting member.

With this configuration, a high-accuracy and high-reliability optical sensor that can suppress the likelihood of foreign matter entering can be obtained.

Further features of the present disclosure will become apparent from the following description of exemplary embodiments with reference to the attached drawings.

DESCRIPTION OF THE EMBODIMENTS

Embodiments of the disclosure will be described with reference to the drawings. Note that the present invention should not be limited to the embodiments described below but can be also implemented in various other forms within the scope of the disclosure.

First Embodiment

An optical sensor includes a base portion, an action portion, a reflecting member disposed at one of the base portion and the action portion, and a detection unit disposed at the other one. The detection unit includes a light source and a light receiving element. The space between the detection unit and the reflecting member is filled with a light transmissive material. A force and/or acceleration is sensed in a process in which the light receiving element detects the light emitted by the light source and reflected by the reflecting member. Various materials may be used as the light transmissive material. From a view point of providing an appropriate elastic modulus in detecting a force or acceleration, the light transmissive material is preferably a resin.

Figure 1:
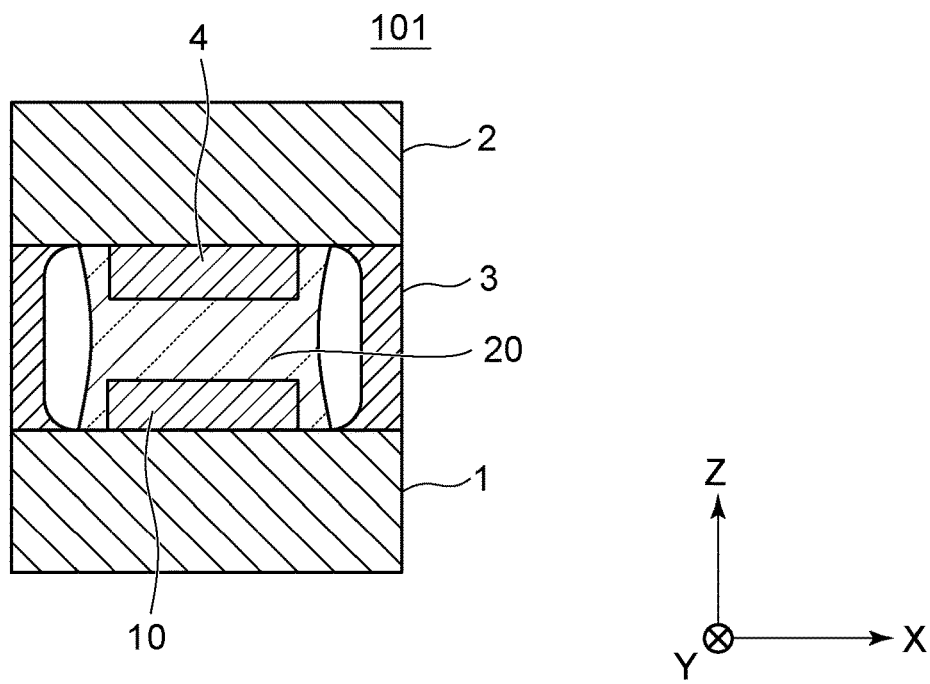
FIG. 1 is a view illustrating a configuration of a force sensor according to a first embodiment.

FIG. 1 illustrates a configuration of a single component force sensor according to a first embodiment.

A sensor 101 includes a base portion 1, an action portion 2, a support member 3, a scale 4, a detection unit 10, and light transmissive resin 20. The sensor 101 detects an external force applied to the action portion 2 in the X-direction in FIG. 1 and outputs a signal in response to the external force.

The shape and material of the support member 3 are such that the support member 3 is elastically deformable in response to an external force acting between the base portion 1 and the action portion 2. The elastic modulus of the support member 3 is designed so as to appropriately respond to a range of external forces to be detected. In other words, the elastic modulus is set lower for easy deformation in the case of detecting small external forces. In the case of detecting large external forces or of increasing mechanical rigidity, the elastic modulus needs to be set higher.

Figure 2:
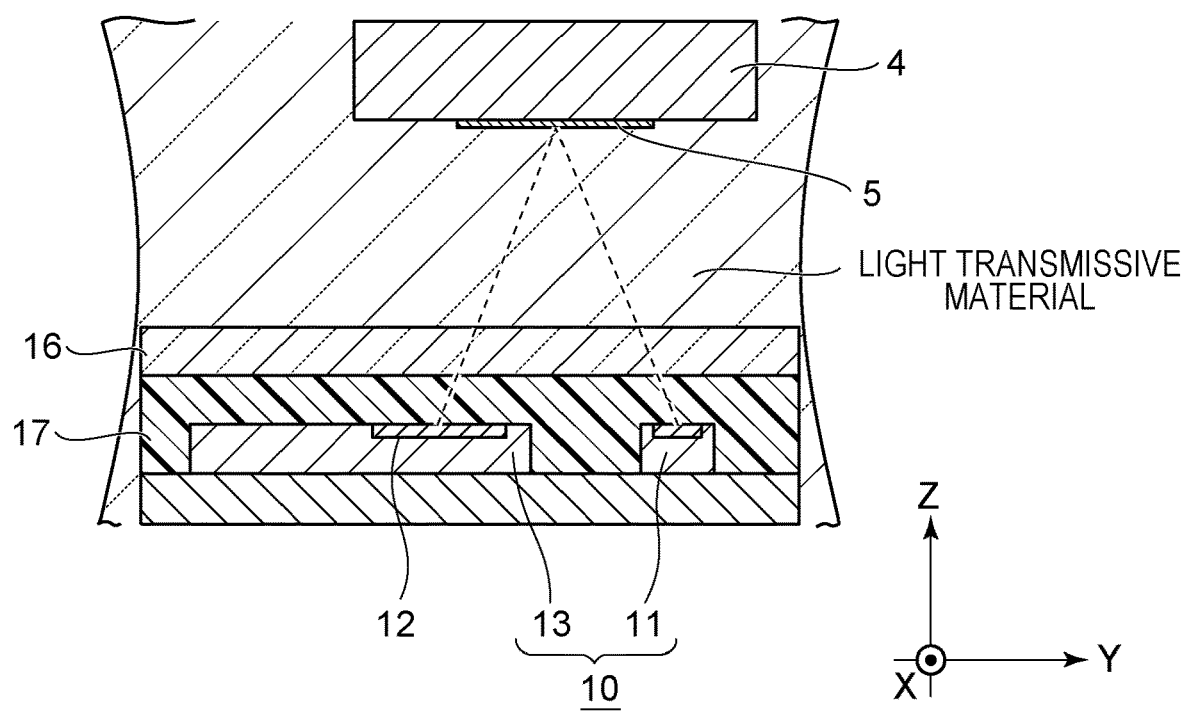
FIG. 2 is a view illustrating an optical path for a detection unit according to first to seventh embodiments.

The detection unit 10 is fixed onto the base portion 1, and the scale 4 is fixed onto the action portion 2. FIG. 2 illustrates an optical path for the detection unit 10.

The detection unit 10 is a sensor unit having both light emitting function and light receiving function, in which a light source 11 and a light receiving IC 13 are formed in the same package. The light source 11 is formed of a current constriction-type LED, and the light receiving IC 13 has a light receiving element array 12 in which light receiving elements are arrayed. A scale 4, which serves as a light reflecting member, is a diffractive grating in which a pattern 5 made of a chromium reflection film is patterned on a glass substrate in a grid-like manner. The light transmissive material, which is filled between the detection unit and the reflecting member, may be, for example, a resin or a gel sheet, which will be described later.

The light receiving element array 12 is formed such that a plurality of detection elements is arrayed so as to detect the intensity distribution of light reflected by the pattern of the scale 4. The detection elements are arranged in the X-direction, in other words, in a direction in which the scale 4 (i.e., the action portion) is moved (i.e., in a measurement direction).

The light source 11 and the light receiving IC 13 are sealed in a transparent resin portion 17, and a cover glass 16 is adhered on the transparent resin portion 17. The transparent resin portion 17 and the cover glass 16 are formed optically integrally.

As the light source 11, a current constriction-type LED, a semiconductor laser, or the like can be used. The light receiving element array 12 functions as a detection element array in which a plurality of detection elements is arranged in the moving direction of the scale 4 (i.e., in the measurement direction). The detection elements detect the distribution of light from the pattern of the scale 4. The detection unit 10 is disposed so as to oppose the scale 4 and detects the amount of relative displacement of the scale 4. The light source 11 emits divergent rays. The divergent rays are reflected by the grating pattern on the scale 4 and form a distribution pattern of amount of light (i.e., interference fringe) on the light receiving element array due to diffraction and interference.

The detection elements of the light receiving element array 12 are allocated cyclically to four phases, in other words, phase A+, phase B+, phase A−, and phase B−. The detection elements allocated to each of the four phases constitute a single light receiving element group. The period of each cyclical allocation is set so as to correspond to the period of the interference fringe. When the period of the interference fringe is 360 degrees, the light receiving elements allocated to phase A+, phase B+, phase A−, and phase B− are disposed at positions that are 90 degrees different in phase from each other.

The light receiving elements constituting each light receiving element group are connected electrically to each other, and outputs (i.e., output currents) from the light receiving elements are added up and are input to one of four current-voltage conversion amplifiers (not illustrated) that are provided for corresponding one of the four phases at a later stage of processing. The four current-voltage conversion amplifiers output four-phase signals S1(A+), S1(B+), S1(A−), and S1(B−).

Signals S1(A+), S1(B+), S1(A−), and S1(B−) are to be voltage signals that change like a sign wave (i.e., sinusoidal voltage) as the scale 4 moves. The four-phase output signals of the current-voltage conversion amplifiers correspond to respective signal phases of 0 degree, 90 degrees, 180 degrees, and 270 degrees. A signal processing circuit (not illustrated) performs calculation processing on the four-phase signals S1(A+), S1(B+), S1(A−), and S1(B−) by using the following equations:

$$S1(A)=S1(A+)-S1(A-)$$

$$S1(B)=S1(B+)-S1(B-)$$

As a result, a direct current component is removed from the four-phase signals, and the four-phase signals are converted into two-phase sinusoidal signals S1(A) and S1(B) that are different in phase by 90 degrees from each other.

In addition, to obtain a phase signal Φ from which a position signal is generated, the signal processing circuit performs calculation processing by using the following equation:

$$\Phi=A\ TAN\ 2[S1(A),S1(B)]$$

where A TAN 2 [Y, X] is an arctangent function that determines a quadrant of a value and returns a result in 0-to-2πphase.

The phase signal Φ corresponds to an amount of movement of the interference fringe caused by the movement of the grating pattern of the scale 4. By accumulating amounts of change in the phase signal Φ, the amount of displacement of the scale 4 in the movement direction (i.e., measurement direction) relative to the detection unit 10 can be detected.

As illustrated in FIG. 1, the light transmissive resin 20 is filled between the cover glass 16 fixed onto the surface of the detection unit 10 and the surface of the scale 4 without allowing any gap. It is sufficient that the region to be filled with the light transmissive resin 20 at least encompasses paths of the rays that are emitted from the light source 11, reflected by the scale 4, and received by the light receiving element array 12.

The light transmissive resin 20 may be, for example, silicone, polyester, an epoxy-based resin, or any suitable material. The support member 3 may be made of stainless steel or the like. Increasing the rigidity of the support member 3 relative to the light transmissive resin 20 can reduce the impact of the light transmissive resin 20 on the entire rigidity. The light transmissive resin 20 may be a UV hardening material, a thermal hardening material, or a material suitable for any other hardening treatment. The light transmissivity of the light transmissive resin 20 is desirably high, but the light transmissivity may be such a level as to enable signals to be detected. The light transmissivity may be exhibited for a wave length to be used. For example, in the case of using an infrared light source (a wave length of 760 nm or higher), the light transmissive resin 20 need not transmit visible light (a wave length of 400 nm to 760 nm). In this case, the light transmissive material blocks visible light and allows infrared light to pass, which thereby reduces disturbance by natural light or the like. In addition, the index of refraction of the light transmissive resin 20 may desirably be similar to that of the cover glass 16 fixed onto the surface of the detection unit 10 in order to minimize reflection at the interface. For example, the index of refraction is preferably 1.2 or higher and 2.0 or lower.

If the light transmissive resin 20 is not used, total reflection occurs at the surface of the cover glass 16 for incident light that exceeds the critical incident angle (approximately 45 degrees) due to the difference in index of refraction between air and the cover glass 16. The total reflection light may become stray light inside the detection unit 10 and may be incident in the light receiving element array. As typical measures to avoid the total reflection, the optical path needs to be elongated within the detection unit 10, which results in an increase in the size of the sensor unit. However, according to the embodiment, by filling the light transmissive resin 20 to the surface of the scale 4 without allowing any gap, reflection at the interface can be suppressed substantially without increasing the length of the optical path.

Moreover, with the configuration according to the embodiment, the light transmissive resin 20 prevents foreign matter from entering while providing an appropriate elastic modulus so as to enable the action portion and the base portion to move relative to each other with an appropriate degree of freedom. At the same time, the light transmissive resin 20 suppresses deterioration of the signal-to-noise ratio caused by stray light. Thus, an optical sensor that can detect forces accurately and reliably can be obtained.

Second Embodiment

Figure 3:
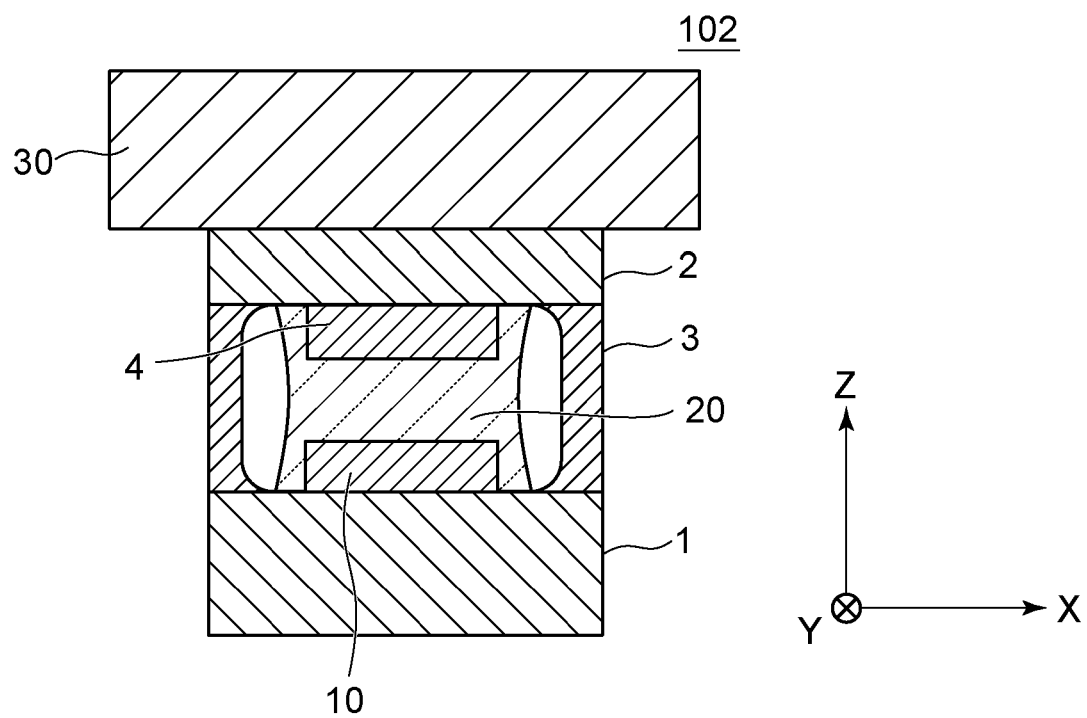
FIG. 3 is a view illustrating a configuration of an acceleration sensor according to a second embodiment.

FIG. 3 illustrates an acceleration sensor 102 according to the second embodiment, which is an example of an optical sensor. In addition to the configuration described in the first embodiment, the acceleration sensor 102 further includes a weight member 30 that is fixed to the action portion 2. The base portion 1 is fixed to an object of which the acceleration is to be measured. The sensor 102 detects acceleration in the X-direction in FIG. 3 and outputs a signal in response to the acceleration. Disposing the weight member can improve sensitivity to detect a force or acceleration and to adjust the resonant frequency of the optical sensor itself.

The light transmissive resin 20 is filled between the cover glass 16 fixed onto the surface of the detection unit 10 and the surface of the scale 4 without allowing any gap. By using a material having an appropriate viscosity, the light transmissive resin 20 can behave as a damper and thereby reduce measurement errors caused by resonance.

Third Embodiment

Figure 4A:
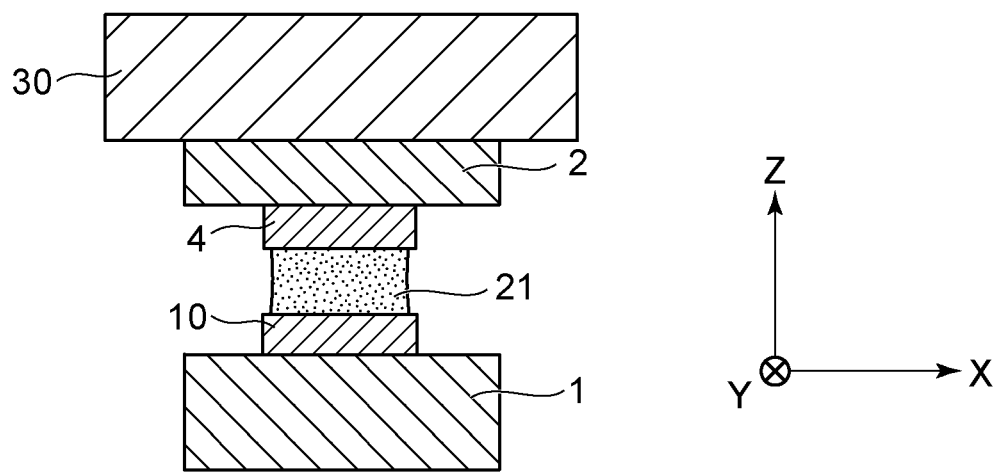
FIG. 4A is a view illustrating a configuration of an acceleration sensor, a velocity sensor, or a vibration sensor according to a third embodiment.

FIG. 4A illustrates a configuration of an acceleration sensor 102, a velocity sensor 102, or a vibration sensor 102, as an example of an optical sensor, according to the third embodiment. The weight member 30 is also fixed to the action portion 2 in the present embodiment as is the case in the second embodiment.

Figure 4B:
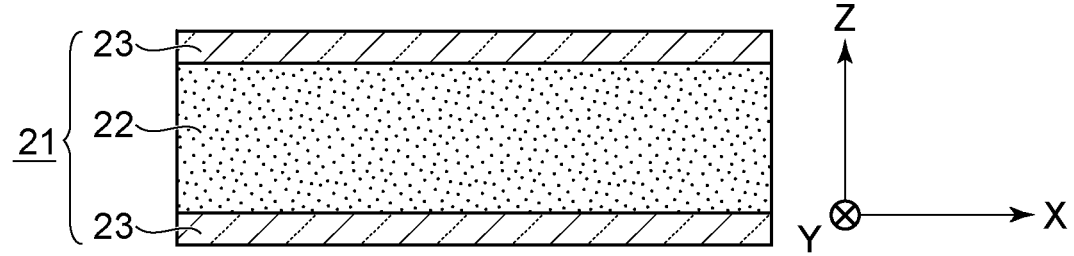
FIG. 4B is a view illustrating a configuration of a gel sheet according to the third embodiment.

A gel sheet 21 illustrated in FIG. 4B is used as the light transmissive resin 20 according to the present embodiment. The gel sheet 21 includes a tabularly-formed transparent resin layer 22 having parallel surfaces and transparent adhesive layers 23 formed on both surfaces of the transparent resin layer 22. The gel sheet 21 is adhered both to the cover glass 16 fixed on the surface of the detection unit 10 and to the surface of the scale 4 without allowing any gap. The gel sheet 21 can readily maintain the detection unit 10 and the scale 4 in parallel without providing any support member separately.

In other words, since the gel sheet is shaped into a sheet, the detection unit and the scale can follow the flat surfaces of the sheet easily.

The light transmissive resin 20 functions as the support member. Sensitivity to acceleration and the range of detectable frequencies depend on the elastic modulus of the light transmissive resin 20.

Note that the amplitude of vibration can be directly detected in a range of frequencies that are higher than the natural frequency. Vibration velocity can be also detected in a range of frequencies near the natural frequency. By causing the light transmissive resin 20 to function as the support member, the optical sensor can be designed to have a low natural frequency without using a massive weight, which can reduce the size and weight of the optical sensor.

Fourth Embodiment

In the fourth embodiment, an example of the optical sensor is applied to a six-component force sensor.

Figure 5A:
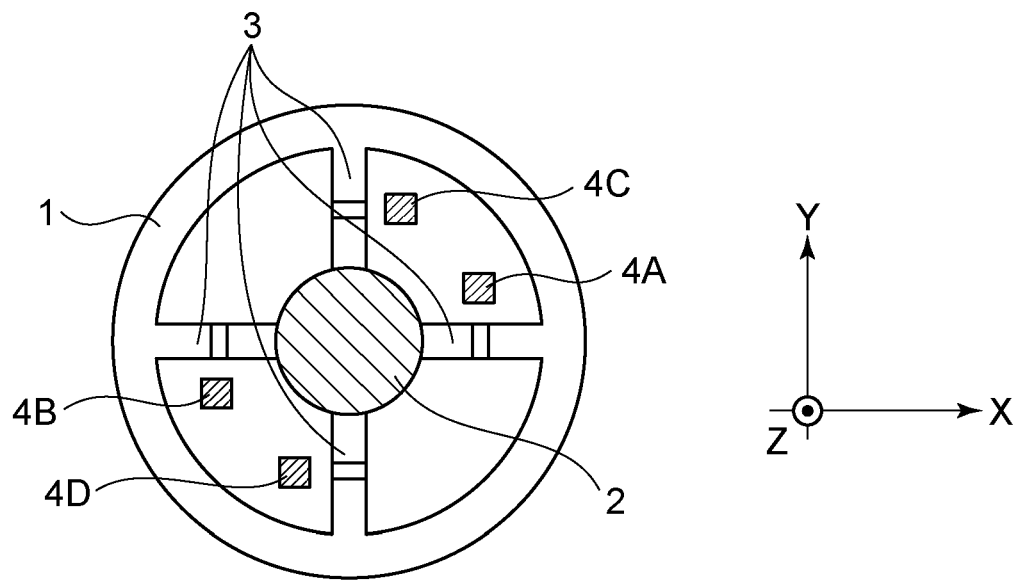
FIG. 5A is a top view illustrating mechanical part of a sensor according to a fourth embodiment.
Figure 5B:
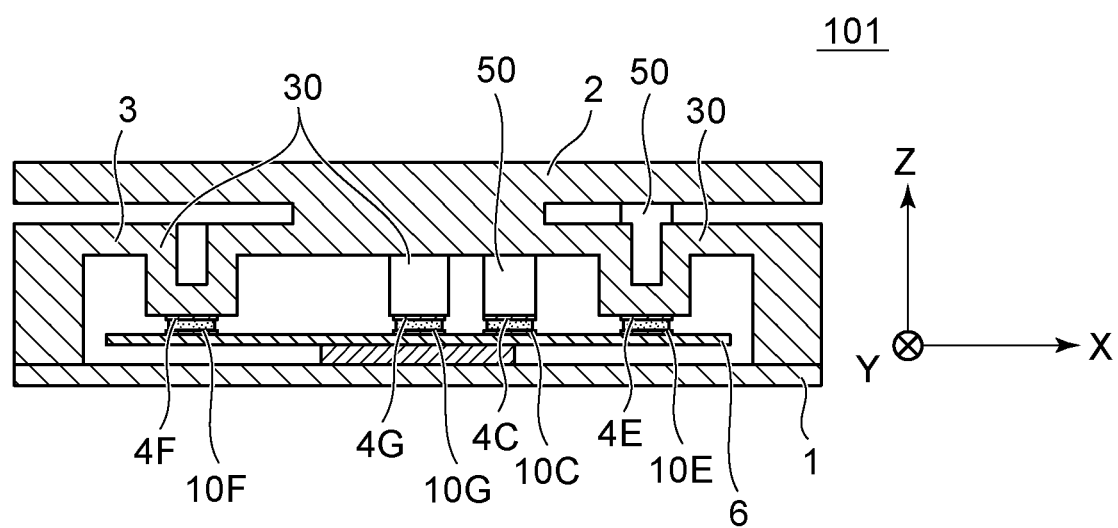
FIG. 5B is a cross-sectional view illustrating the mechanical part of the sensor according to the fourth embodiment.

The mechanical part of a sensor 101 according to the present embodiment further includes a plurality of beam-like support members 3 that connects the base portion 1 and the action portion 2 to each other. The support members 3 have a function of converting displacement direction. FIG. 5A illustrates the mechanical part of a force sensor as viewed from above while top part of the action portion 2 is made invisible. FIG. 5B illustrates a cross section of the force sensor according to the present embodiment, in which the force sensor in FIG. 5A is cut at the center of the action portion 2 along support members 3 in the right-left direction in FIG. 5A. There are shown a scale 4G and a scale 4C that are disposed in the deeper side in FIG. 5B.

Figure 6:
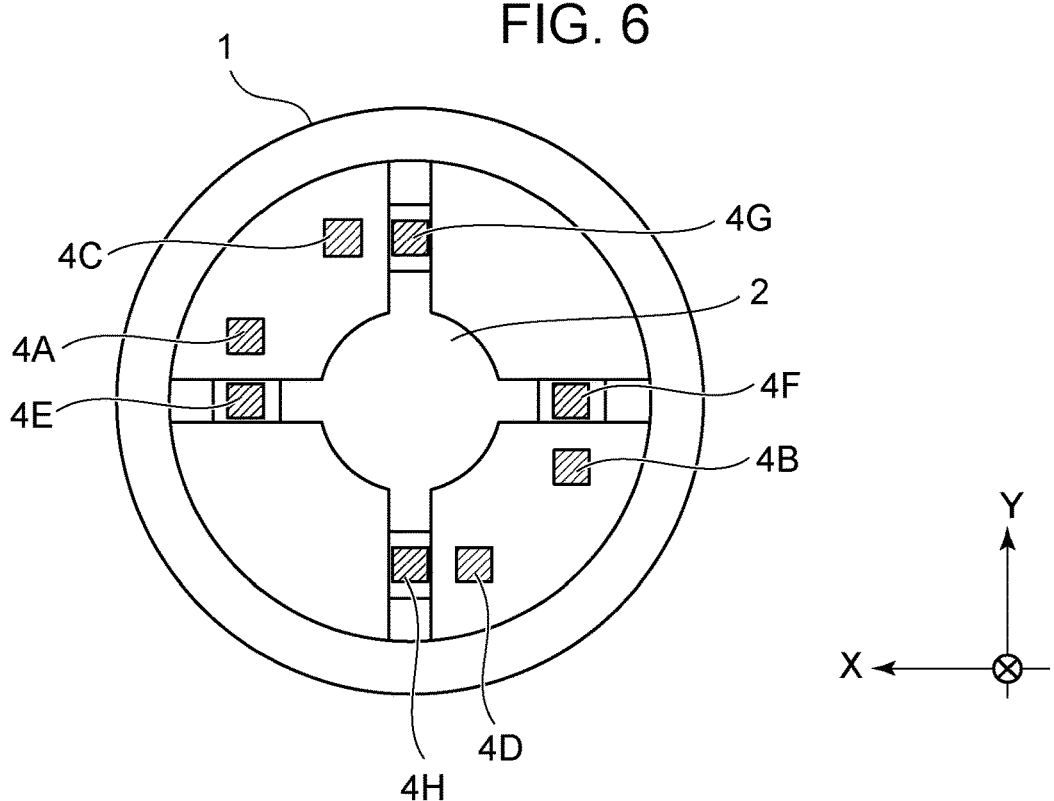
FIG. 6 is a bottom view illustrating the mechanical part of the sensor according to the fourth embodiment.

FIG. 6 illustrates the mechanical part of the force sensor when the bottom of the mechanical part is viewed in the Z-direction while a bottom lid and a circuit substrate 6 are removed. The gel sheets 21 described in the third embodiment are adhered between detection units 10A to 10H and respective scales 4A to 4H.

The function of converting the displacement direction is implemented by a displacement direction conversion mechanism 30 that is shaped into a letter U. In other words, when a force in the negative Z-direction acts on the action portion 2, the displacement direction conversion mechanism 30 deforms and thereby displaces the scales 4E, 4F, 4G, and 4H in directions in an XY plane as well as in the negative Z-direction.

The scales 4A, 4B, 4C, and 4D are adhered to respective columnar members 50 that are joined to the action portion 2. When forces in the X-direction and in the Y-direction and a moment about the Z-axis are applied to the action portion 2, directions of the forces and the moment change in the XY plane.

Figure 7:
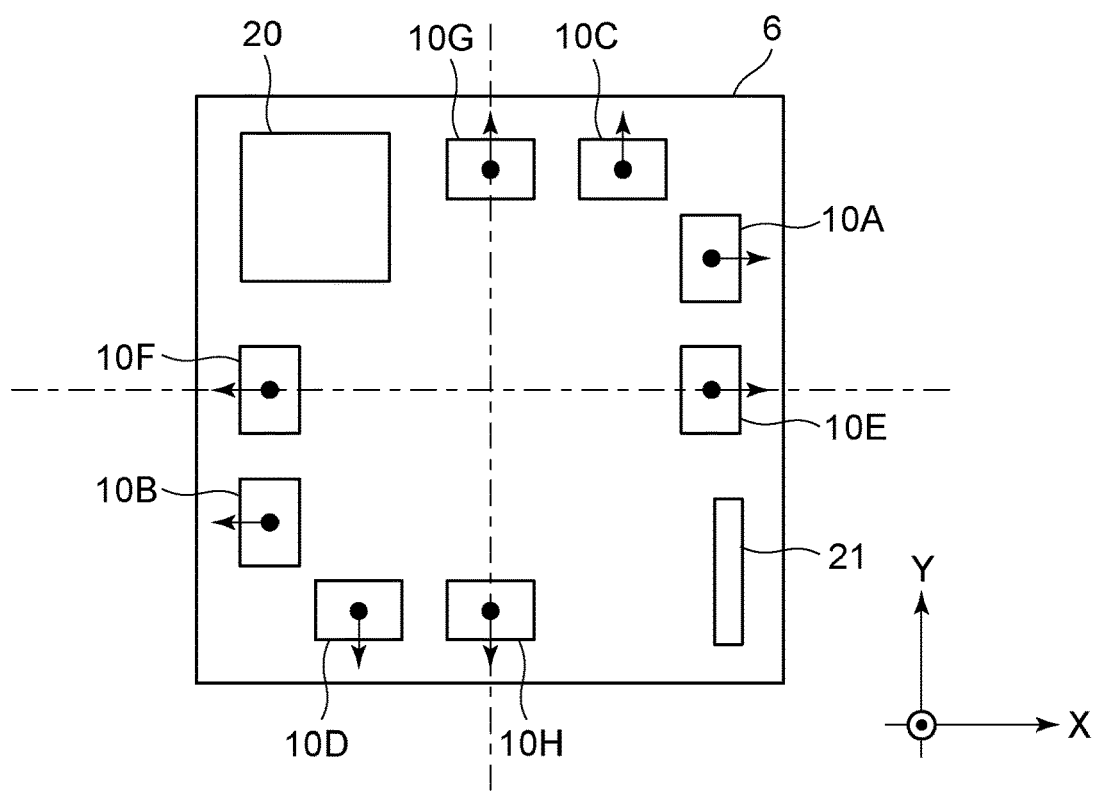
FIG. 7 is a plan view illustrating a circuit substrate according to the fourth embodiment.

FIG. 7 illustrates the circuit substrate 6 that is joined to the base portion 1. The positional relationship is shown with respect to the coordinate system in FIG. 7, in which the X-axis and the Y-axis form a cross.

Detection units 10A to 10H are implemented in the circuit substrate 6. Electrical components, such as a signal processing IC 20 and a connector 21, are also mounted on the circuit substrate 6.

The detection units 10A and 10B detect displacement in the X-direction in FIG. 7. The detection units 10C and 10D detect displacement in the Y-direction in FIG. 7. Respective detection directions of the detection units 10A and 10B are parallel to the X-axis. The detection units 10A and 10B are spaced in the X-direction and in the Y-direction and are disposed symmetrically with respect to the center of the mechanical part. In addition, when the mechanical part is divided into four quadrants by straight lines passing through the center of the mechanical part and parallel to the X-axis and the Y-axis, the detection units 10A and 10C are disposed in the same quadrant and the detection units 10B and 10D are disposed in the same quadrant. The signal processing IC 20 and the connector 21 are disposed in quadrants in which the detection unit 10A and 10B are not disposed.

The detection unit 10E detects displacement in the X-direction. The detection unit 10E is disposed on the X-axis at the substantially same position as the detection unit 10A in the X-direction. The detection unit 10F also detects displacement in the X-direction. The detection unit 10F is disposed on the X-axis at the substantially same position as the detection unit 10B in the X-direction. The detection unit 10G detects displacement in the Y-direction. The detection unit 10G is disposed on the Y-axis at the substantially same position as the detection unit 10C in the Y-direction. The detection unit 10H also detects displacement in the Y-direction. The detection unit 10H is disposed on the Y-axis at the substantially same position as the detection unit 10D in the Y-direction.

The sensor 101 can receive six components of external force (i.e., X-direction force Fx, Y-direction force Fy, Z-direction force Fz, Moment about X-axis Mx, Moment about Y-axis My, and Moment about Z-axis Mz) and two components of thermal expansion (X-direction expansion Tx and Y-direction expansion Ty). Amounts of displacement in response to respective inputs of the above components are collated in 8 by 8 matrix Dmat, which is expressed as:

$$Dmat = \begin{bmatrix} Da\_Fx, & Da\_Fy, & Da\_Fz, & Da\_Mx, & Da\_My, & Da\_Mz, & Da\_Tx, & Da\_Ty \\ Db\_Fx, & Db\_Fy, & Db\_Fz, & Db\_Mx, & Db\_My, & Db\_Mz, & Db\_Tx, & Db\_Ty \\ Dc\_Fx, & Dc\_Fy, & Dc\_Fz, & Dc\_Mx, & Dc\_My, & Dc\_Mz, & Dc\_Tx, & Dc\_Ty \\ Dd\_Fx, & Dd\_Fy, & Dd\_Fz, & Dd\_Mx, & Dd\_My, & Dd\_Mz, & Dd\_Tx, & Dd\_Ty \\ De\_Fx, & De\_Fy, & De\_Fz, & De\_Mx, & De\_My, & De\_Mz, & De\_Tx, & De\_Ty \\ Df\_Fx, & Df\_Fy, & Df\_Fz, & Df\_Mx, & Df\_My, & Df\_Mz, & Df\_Tx, & Df\_Ty \\ Dg\_Fx, & Dg\_Fy, & Dg\_Fz, & Dg\_Mx, & Dg\_My, & Dg\_Mz, & Dg\_Tx, & Dg\_Ty \\ Dh\_Fx, & Dh\_Fy, & Dh\_Fz, & Dh\_Mx, & Dh\_My, & Dh\_Mz, & Dh\_Tx, & Dh\_Ty \end{bmatrix}$$

In a design according to the present embodiment, the amounts of displacement are set in micrometer as follows:

$$Dmat = \begin{bmatrix} 20 & 0 & 0 & 0 & -5 & -20 & 5 & 0 \\ -20 & 0 & 0 & 0 & 5 & -20 & 5 & 0 \\ 0 & 20 & 0 & 5 & 0 & 20 & 0 & 5 \\ 0 & -20 & 0 & -5 & 0 & 20 & 0 & 5 \\ 10 & 0 & -20 & 0 & 30 & 0 & 5 & 0 \\ -10 & 0 & -20 & 0 & -30 & 0 & 5 & 0 \\ 0 & 10 & -20 & -30 & 0 & 0 & 0 & 5 \\ 0 & -10 & -20 & 30 & 0 & 0 & 0 & 5 \end{bmatrix}$$

Put another way, the optical sensor includes a base portion, an action portion that is displaced with respect to the base portion by receiving an external force, and an elastic support member that connects the base portion and the action portion to each other.

The optical sensor further includes a first displacement sensor pair having two displacement sensors that detect displacement of the action portion in a first direction with respect to the base portion (for example, the detection units 10A and 10B that detect displacement in the X-direction as illustrated in FIG. 7).

The optical sensor also includes a second displacement sensor pair having two displacement sensors that detect displacement of the action portion in a second direction, which intersects the first direction, with respect to the base portion (for example, the detection units 10C and 10D that detect displacement in the Y-direction as illustrated in FIG. 7).

When a plane is divided into four quadrants by two straight lines that pass through the middle point between the two displacement sensors that constitute the first displacement sensor pair and that extend in the first direction and in the second direction, respectively, the displacement sensors of the second displacement sensor pair are disposed in two quadrants of the plane in which the displacement sensors of the first displacement sensor pair are disposed.

With this arrangement, the plus/minus signs of Da and Dc and the plus/minus signs of Db and Dd are inverted when Mz is added and when the temperature T is added, which enables both components to be separated therefrom with a favorable signal-to-noise ratio.

Since the components related to thermal expansion can be separated therefrom with sufficient accuracy, the components other than Mz can be corrected for the influence of temperature variation, which is described below.

On the basis of the outputs of the detection units 10, six components of external force and two components of thermal expansion are obtained from the following calculation:

$$\begin{bmatrix} Fx \\ Fy \\ Fz \\ Mx \\ My \\ Mz \\ Tx \\ Ty \end{bmatrix} = C \times \begin{bmatrix} Da \\ Db \\ Dc \\ Dd \\ De \\ Df \\ Dg \\ Dh \end{bmatrix}$$

Here, C is a transformation matrix with which the outputs of the detection units 10 are converted into the six components of external force and the two components of thermal expansion. The transformation matrix C, which is obtained from an inverse matrix of Dmat, is as follows:

$$C = \begin{bmatrix} 0.0231 & -0.0231 & 0 & 0 & 0.0038 & -0.0038 & 0 & 0 \\ 0 & 0 & 0.0231 & -0.0231 & 0 & 0 & 0.0038 & -0.0038 \\ 0.0125 & 0.0125 & 0.0125 & 0.0125 & -0.0125 & -0.0125 & -0.0125 & -0.0125 \\ 0 & 0 & 0.0077 & -0.0077 & 0 & 0 & -0.0154 & 0.0154 \\ -0.0077 & 0.0077 & 0 & 0 & 0.0154 & -0.0154 & 0 & 0 \\ -0.0125 & -0.0125 & 0.0125 & 0.0125 & 0.125 & 0.0125 & -0.0125 & -0.0125 \\ 0.05 & 0.05 & 0.05 & 0.05 & 0.05 & 0.05 & -0.05 & -0.05 \\ 0.05 & 0.05 & 0.05 & 0.05 & -0.05 & -0.05 & 0.05 & 0.05 \end{bmatrix}$$

Here, six components of external force and two components of thermal expansion are detected and separated independently of each other, which is described further below. Assume that an independent input is entered for each component and displacement outputs from the detection units 10 are expressed as 8 by 8 matrix Dmat. By multiplying Dmat by the transformation matrix C, the following diagonal matrix is obtained due to the nature of inverse matrix:

$$C \times Dmat = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}$$

Each of the detection units 10 detects and outputs a very small amount of displacement compared with the size of the structure. Accordingly, superposition approximation applies to the responses of the components of external force. Accordingly, eight components Fx, Fy, Fz, Mx, My, Mz, Tx, and Ty can be separated and detected as independent components even if these components act together.

Thus, the optical sensor according to the present embodiment can suppress the likelihood of foreign matter entering while providing an appropriate elastic modulus so as to enable the action portion and the base portion to move relative to each other with an appropriate degree of freedom. At the same time, the optical sensor can suppress deterioration of the signal-to-noise ratio caused by stray light.

Fifth Embodiment

In the fifth embodiment, an example of the optical sensor is applied to another six-component force sensor. Configurations of the mechanical part of the sensor 101 and the circuit substrate are similar to those of the fourth embodiment.

Figure 8:
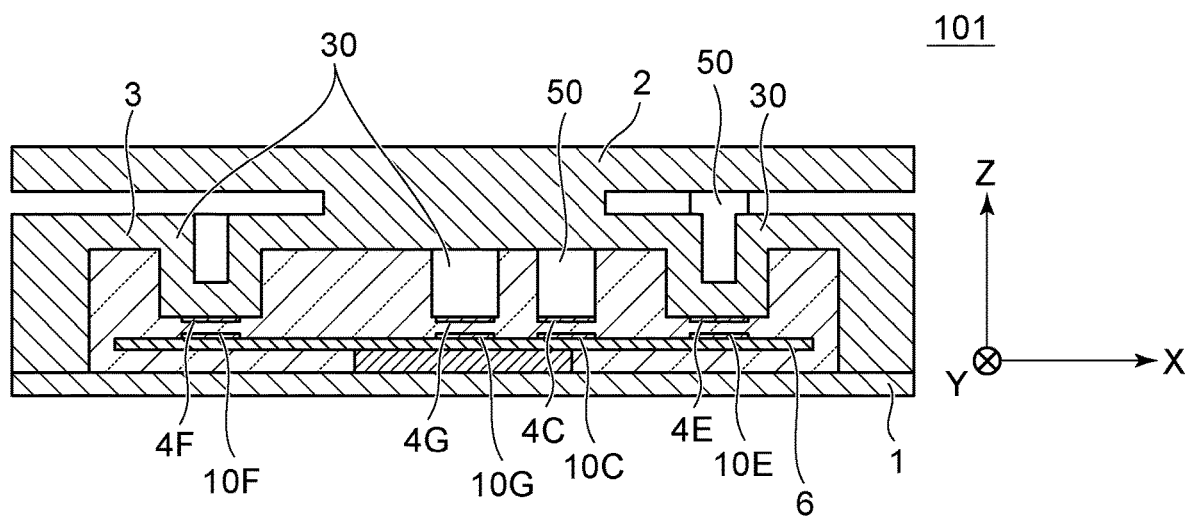
FIG. 8 is a cross-sectional view illustrating mechanical part of a sensor according to a fifth embodiment.

FIG. 8 illustrates a cross section of a force detection unit according to the present embodiment. In place of the gel sheet 21 in the fourth embodiment, the space inside the unit including the vicinity of the circuit substrate 6 is filled with the light transmissive resin 20. This can improve environmental resistance, such as water- and dust-proof capabilities, of both the sensor unit and the circuit portion. If a heat conductive resin, such as a silicone resin, is used as the light transmissive resin 20, the circuit can radiate heat efficiently. A urethane resin or an acrylic resin can be also used suitably.

Sixth Embodiment

In the sixth embodiment, an example of the optical sensor is applied to another six-component force sensor.

Figure 9:
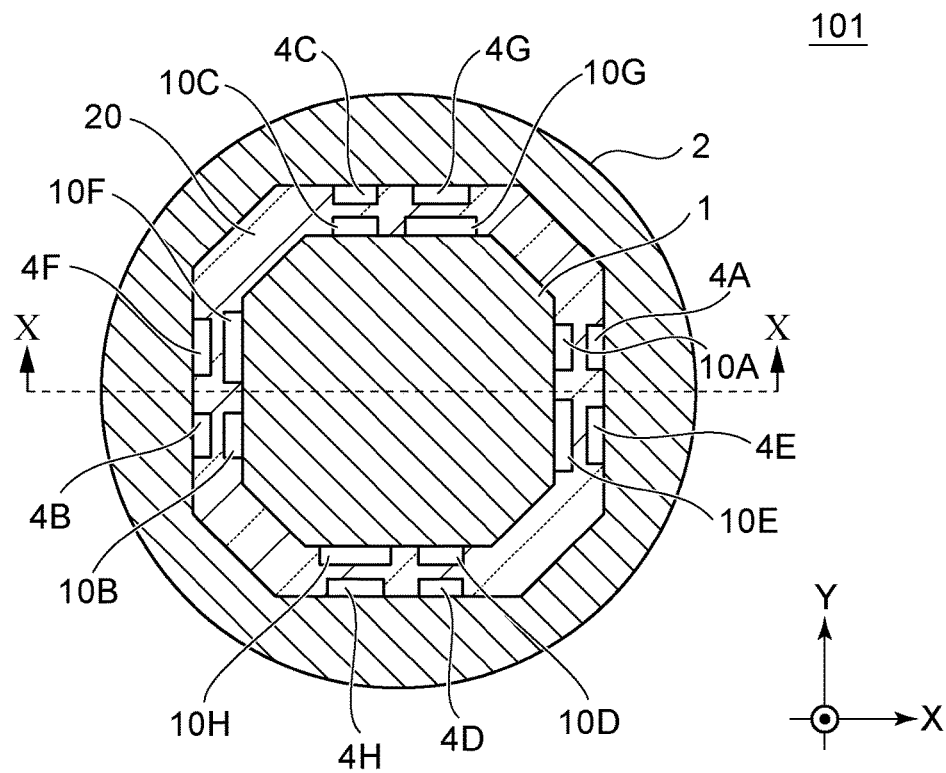
FIG. 9 is a top view illustrating mechanical part of a sensor according to a sixth embodiment.
Figure 10:
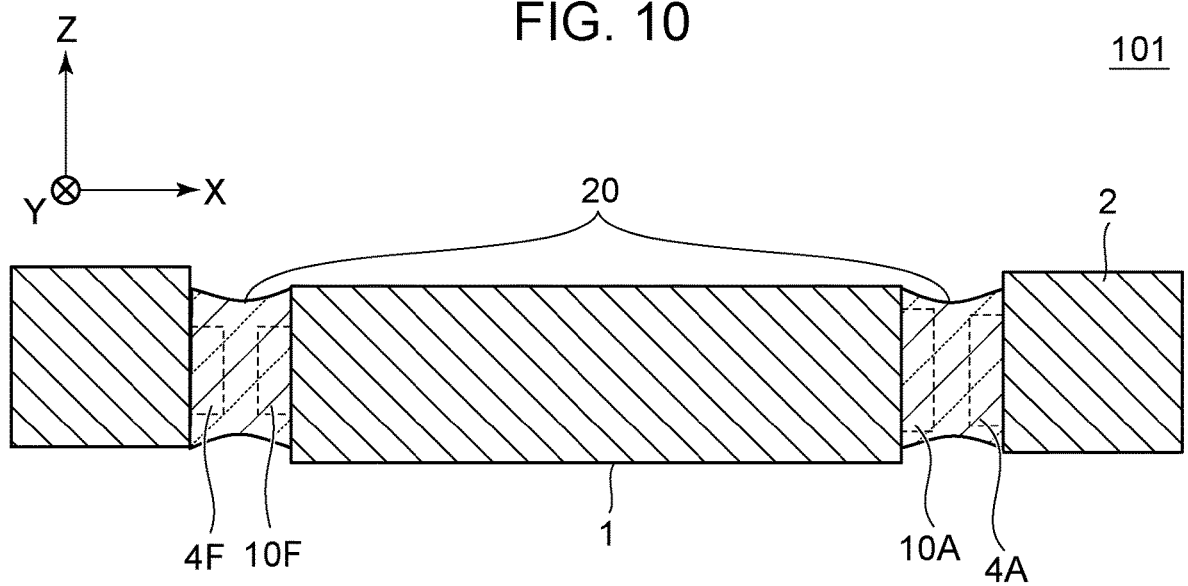
FIG. 10 is a cross-sectional view illustrating the mechanical part of the sensor according to the sixth embodiment.

FIG. 9 illustrates mechanical part of a sensor 101 according to the present embodiment as viewed from above. FIG. 10 illustrates a cross section of the sensor in FIG. 9 as viewed sideways. The sensor 101 includes an outer ring portion that serves as the action portion 2 and an inner portion that serves as the base portion 1. The detection units 10A to 10H are fixed to the base portion 1, and the scales 4A to 4H are fixed to the action portion 2. The space between the base portion 1 and the action portion 2 is filled with the light transmissive resin 20 without allowing any gap.

The detection units 10A and 10B are disposed so as to detect displacement in the Y-direction, while the detection units 10C and 10D are disposed so as to detect displacement in the X-direction. The detection units 10E, 10F, 10G, and 10H are disposed so as to detect displacement in the Z-direction. The outputs of eight detection units 10A to 10H can be converted into six components of external force by using the same calculation method as used in the fourth embodiment.

With the configuration according to the present embodiment, the light transmissive resin 20 functions as a support member, which can simplify parts to be used in the mechanical part and also can make the sensor unit thin.

Seventh Embodiment

Figure 11:
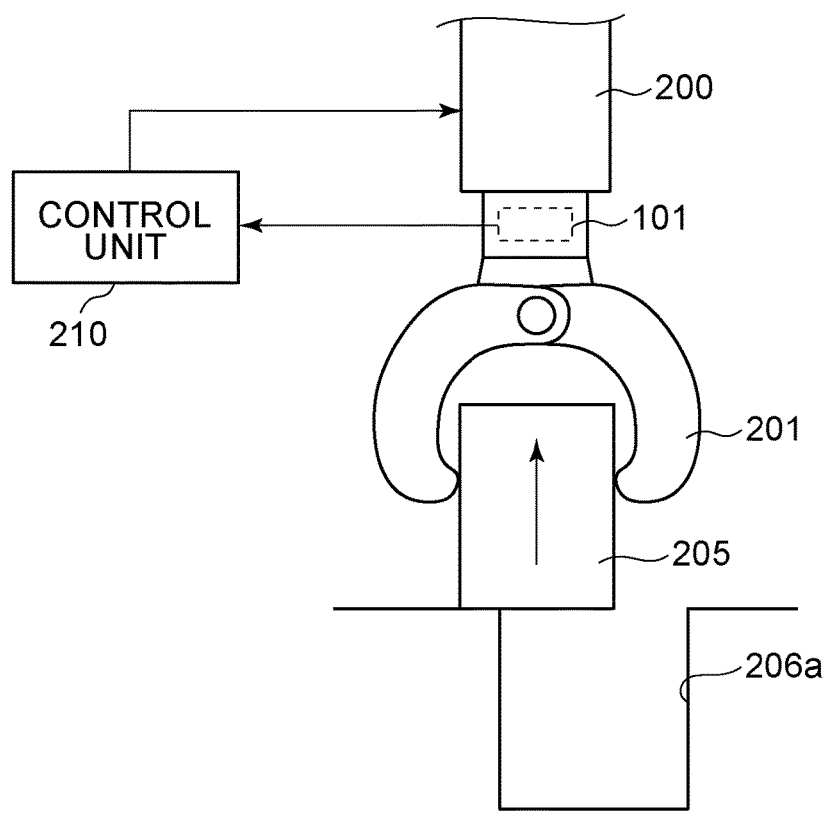
FIG. 11 is a diagram illustrating a configuration of a robot-arm conveyor apparatus according to a seventh embodiment.

With reference to FIG. 11, a robot-arm conveyor apparatus according to the seventh embodiment will be described as an example of an apparatus that includes the optical sensor. FIG. 11 illustrates a configuration of a robot-arm conveyor apparatus 400 according to the present embodiment. The robot-arm conveyor apparatus 400 is equipped with the sensor 101 described in the fourth to sixth embodiments.

The robot-arm conveyor apparatus 400 includes a robot arm 200. The robot arm 200 is operable as a movable portion and includes a holding portion 201 that holds a conveyance object 205. In FIG. 11, the robot arm 200 operates so as to insert the conveyance object 205 into a hole 206a formed in the base plate 206, and the operation is controlled by the control unit 210.

The robot arm 200 is equipped with a sensor 101 (an optical force sensor) for detecting an upward external force that the holding portion 201 receives from the base plate 206 via the conveyance object 205. When the conveyance object 205 is in contact with part of the top surface (i.e., part other than the hole 206a) of the base plate 206, the position of the conveyance object 205 is detected not aligning with the hole 206a since an external force acts on the sensor 101 via the holding portion 201. Consequently, the control unit 210 controls the robot arm 200 to move the conveyance object 205 along the surface of the base plate 206.

When the conveyance object 205 is positioned above the hole 206a, the external force acting on the sensor 101 via the holding portion 201 ceases to act, and the conveyance object 205 is thereby detected aligning with the hole 206a. Consequently, the control unit 210 controls the robot arm 200 to inert the conveyance object 205 into the hole 206a.

In summary, the apparatus (the robot-arm conveyor apparatus 400) according to the present embodiment includes the movable portion (holding portion 201), the sensor unit (optical force sensor) according to the fourth to sixth embodiments, and the control unit 210 that controls the movable portion by using the force sensor. The operation of the robot arm 200 can be controlled in high accuracy because of the robot arm 200 being equipped with the sensor 101 described in the fourth to sixth embodiments. Note that the sensor 101 described in the first to sixth embodiments can be applied to various other types of apparatuses that control operation by using the detection results of external forces in addition to the application to the robot-arm conveyor apparatus 400 described in the present embodiment.

As described in the above embodiments, a highly accurate and highly reliable force sensor and apparatus can be provided.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-072602, filed Apr. 4, 2018, which is hereby incorporated by reference herein in its entirety.

What is claimed is:

1. An optical sensor comprising:
a base portion;
an action portion;
a reflecting member disposed at one of the base portion and the action portion; and
a detection unit including a light source and a light receiving element disposed at the other one of the base portion and the action portion,
wherein a space between the detection unit and the reflecting member is filled with a light transmissive material and with no air gap layer,
wherein the space includes an optical path that leads from the light source, is reflected by the reflecting member, and leads to the light receiving element, and
wherein the optical sensor is configured to detect a force and/or acceleration due to the light receiving element detecting light emitted from the light source and reflected by the reflecting member.

2. The optical sensor according to claim 1, further comprising a support member that supports the base portion and the action portion.

3. The optical sensor according to claim 1, further comprising a weight member disposed in the action portion.

4. The optical sensor according to claim 1,
wherein the light transmissive material has an index of refraction of 1.2 or more and 2.0 or less.

5. The optical sensor according to claim 1,
wherein the light transmissive material blocks visible light and allows infrared light to transmit.

6. The optical sensor according to claim 1,
wherein the light transmissive material is a light transmissive resin.

7. The optical sensor according to claim 6,
wherein the light transmissive resin is selected from the group consisting of a silicone resin, a urethane resin, an acrylic resin, an epoxy resin, and a polyester resin.

8. The optical sensor according to claim 6,
wherein the light transmissive resin is a gel sheet having a transparent adhesive layer and a transparent resin layer.

9. The optical sensor according to claim 1,
wherein the light receiving element is formed as an array, and the reflecting member has a diffractive grating.

10. An apparatus, comprising:
a movable portion that is operable;
the optical sensor according to claim 1; and
a control unit that controls the movable portion.

11. The apparatus according to claim 10,
wherein the movable portion is a robot arm.

* * * * *